United States Patent
Lei

(10) Patent No.: US 11,328,270 B2
(45) Date of Patent: May 10, 2022

(54) SERVICE PROCESSING METHOD AND APPARATUS

(71) Applicant: Alipay Labs (Singapore) Pte. Ltd., Singapore (SG)

(72) Inventor: Jia Lei, Zhejiang (CN)

(73) Assignee: Alipay Labs (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/356,324

(22) Filed: Jun. 23, 2021

(65) Prior Publication Data
US 2022/0027868 A1    Jan. 27, 2022

(30) Foreign Application Priority Data
Jul. 23, 2020 (CN) .......................... 202010718483.4

(51) Int. Cl.
| | | |
|---|---|---|
| *G06Q 30/06* | (2012.01) | |
| *G06Q 20/08* | (2012.01) | |
| *G06Q 40/02* | (2012.01) | |
| *G06Q 10/08* | (2012.01) | |
| *G06F 16/953* | (2019.01) | |
| *G06Q 20/40* | (2012.01) | |

(52) U.S. Cl.
CPC ......... *G06Q 20/085* (2013.01); *G06F 16/953* (2019.01); *G06Q 10/08355* (2013.01); *G06Q 20/4014* (2013.01); *G06Q 20/4015* (2020.05); *G06Q 30/0631* (2013.01); *G06Q 30/0633* (2013.01); *G06Q 40/02* (2013.01)

(58) Field of Classification Search
CPC .............................................. G06Q 30/06–08
See application file for complete search history.

(56) References Cited

U.S. PATENT DOCUMENTS

| | | | | |
|---|---|---|---|---|
| 2003/0083961 A1* | 5/2003 | Bezos | ................ | G06Q 30/0633 705/26.8 |
| 2003/0105682 A1* | 6/2003 | Dicker | ............... | G06Q 30/0633 705/26.8 |
| 2007/0094155 A1* | 4/2007 | Dearing | ............. | G06Q 10/0633 705/410 |

(Continued)

*Primary Examiner* — Ming Shui
(74) *Attorney, Agent, or Firm* — Seed IP Law Group LLP

(57) ABSTRACT

Implementations of the present specification provide a service processing method. The method is performed by a service platform, the service platform including multiple area sites corresponding to multiple service areas, and each area site including a corresponding buyer service site and seller service site. The method includes: splitting a whole-order service into a buyer service and a seller service; further, on one hand, routing the buyer service to a buyer service site in a service area that a corresponding buyer belongs to, for the buyer service site to process the buyer service through interconnection with the buyer based on an area user identifier, and to locally store processed data, where the area user identifier is determined based on multiple area identities associated with a domain-wide identity corresponding to the buyer; and on the other hand, routing the seller service to a seller service site in a service area that a corresponding seller belongs to, for the seller service site to process the seller service through interconnection with the seller, and to locally store processed data.

20 Claims, 5 Drawing Sheets

(56) References Cited

U.S. PATENT DOCUMENTS

2007/0169181 A1* 7/2007 Roskind ............... H04L 9/3271
  726/5
2015/0032571 A1* 1/2015 Delingat ............ G06Q 30/0631
  705/26.43

* cited by examiner

SERVICE PROCESSING METHOD AND APPARATUS

BACKGROUND

Technical Field

Implementations of the present specification relate to the field of computer technologies, and in particular, to a service processing method and apparatus.

Description of the Related Art

In the current trend of internationalization, to better meet user requirements, many service platforms develop cross-country or cross-region services, so that platform users in different countries or regions can implement service transactions through the service platforms. For example, Chinese buyers can purchase products provided by sellers in other countries or regions. In addition, in the current big data era, data security is particularly important. Most countries and regions propose data security-related regulatory requirements. In addition, different countries or regions have different compliance requirements for service data. For example, some countries require that user data generated in their territories cannot be stored abroad, and others require that user data generated in their territories cannot be stored in blacklisted countries that are specified by the countries.

To enable cross-domain services developed by the service platform to meet differentiated data regulatory requirements of various countries, it is common practice in the industry to physically isolate services in different countries or regions. For example, a certain service platform establishes country sites in two countries respectively, and deployment and data storage of each site is totally isolated. Such practice causes inconvenience to platform users. For example, if a Chinese buyer wants to use services provided by country sites other than a Chinese site, the buyer needs to re-register accounts with the other country sites, or if a Chinese seller wants to provide products sold by the seller to other country sites, the seller needs to re-sign up with the other country sites.

BRIEF SUMMARY

Implementations of the present specification describe a service processing method and apparatus, which can effectively simplify an operation process of a user on a service platform while meeting differentiated data regulatory requirements of different places, so as to optimize user experience.

According to a first aspect, a service processing method is provided. The method is performed by a service platform, the service platform includes multiple area sites corresponding to multiple service areas, and each area site includes a corresponding buyer service site and seller service site; and the method includes: receiving a payment request initiated by a first buyer for a first order, the first buyer corresponding to a first domain-wide user identifier, a product in the first order being provided by a first seller, and the payment request including a selected payment channel; determining a first service area that a buyer payment service corresponding to the payment request belongs to, a first area site corresponding to the first service area including a first buyer service site, the first buyer having a first area user identifier in the first service area, which is determined based on multiple area user identifiers associated with the first domain-wide user identifier, and a place of registration of a payment institution corresponding to the payment channel being located in the first service area; routing the buyer payment service to the first buyer service site, for the first buyer service site to process the buyer payment service through interconnection with the payment channel and interconnection with the first buyer based on the first area user identifier, and to locally store service data generated by the processing the buyer payment service; obtaining a payment success message corresponding to the payment request; determining that a to-be-processed seller delivery service belongs to a second service area based on the payment success message, a place of registration of the first seller being located in the second service area, and a second area site corresponding to the second service area including a second seller service site; and routing the seller delivery service to the second seller service site, for the second seller service site to process the seller delivery service through interconnection with the first seller, and to locally store service data generated by the processing the seller delivery service.

In an implementation, before the receiving the payment request initiated by the first buyer for the first order, the method further includes: determining the first domain-wide user identifier corresponding to the first buyer in response to a successful login of the first buyer; and creating the first order in response to receiving an order creation request initiated by the first buyer based on the product.

In an implementation, the determining the first domain-wide user identifier corresponding to the first buyer includes: obtaining a user name of the first buyer; and performing a hash operation on the user name to obtain the first domain-wide user identifier; or querying the first domain-wide user identifier based on a pre-established mapping relationship between a user name and a domain-wide user identifier.

In an implementation, after the creating the first order and before the receiving the payment request initiated by the first buyer for the first order, the method further includes: obtaining location element information of the first buyer; determining a service area in which the first buyer is currently located based on the location element information, and using the service area as the first service area; determining the first area user identifier of the first buyer in the first service area based on the multiple area user identifiers corresponding to multiple service areas; and obtaining multiple candidate payment channels for selection by the first buyer, where places of registration of payment institutions corresponding to the multiple candidate payment channels are all located in the first service area.

Further, in an implementation, the location element information includes at least one of longitude and latitude information, a network address, an Internet Protocol (IP) address, and a consignee address included in the first order.

In an implementation, the determining the first area user identifier of the first buyer in the first service area based on the multiple area user identifiers corresponding to the multiple service areas includes: creating a new user identifier as the first area user identifier when a user identifier corresponding to the first service area does not exist in the multiple area user identifiers; and classifying the first area user identifier into the multiple area user identifiers.

In an implementation, the determining the first service area that the buyer payment service corresponding to the payment request belongs to includes: determining a place of registration corresponding to the payment channel, and using a service area in which the place of registration is located as the first service area.

In an implementation, after the determining the first service area that the buyer payment service corresponding to the payment request belongs to, and before the routing the buyer payment service to the first buyer service site, the method further includes: determining the first area user identifier of the first buyer in the first service area based on the multiple area user identifiers corresponding to multiple service areas.

In an implementation, the determining the second service area the to-be-processed seller delivery service belongs to based on the payment success message includes: determining a place of registration of the first seller based on the payment success message, and using a service area in which the place of registration is located as the second service area.

In an implementation, after the routing the seller delivery service to the second seller service site, the method further includes: routing an order settlement service corresponding to the first seller to the second seller service site, for the second seller service site to process the order settlement service through interconnection with the second seller, and to locally store service data generated by the processing the order settlement service.

In an implementation, the multiple service areas correspond to multiple area sites, and after the routing the seller delivery service to the second seller service site, the method further includes: in response to an order viewing instruction sent by the first buyer, querying order information of multiple orders associated with the multiple area user identifiers from the multiple area sites for viewing by the first buyer, where the multiple orders include the first order.

In an implementation, the multiple service areas correspond to multiple area sites, and before the receiving the payment request initiated by the first buyer for the first order, the method further includes: querying multiple historical orders associated with the multiple area user identifiers from the multiple area sites; and recommending a product to the first buyer based on purchased products included in the multiple historical orders.

According to a second aspect, a service processing method is provided. The method is performed by a service platform, the service platform includes multiple area sites corresponding to multiple service areas, and each area site includes a corresponding seller service site and buyer service site; and the method includes: determining that a first service currently needs to be processed; in response to determining that the first service needs to be processed through interconnection with a first buyer, determining a first buyer service site corresponding to a first service area that the first buyer belongs to, the first buyer corresponding to a first domain-wide user identifier and having a first area identity in the first service area, which is determined based on multiple area user identifiers associated with the first domain-wide user identifier; routing the first service to the first buyer service site, for the first buyer service site to process the first service through interconnection with the first buyer based on the first area user identifier, and to locally store service data generated by the processing the first service; in response determining that the first service needs to be processed through interconnection with a first seller, determining a second seller service site corresponding to a second service area that the first seller belongs to, a place of registration of the first seller being located in the second service area; and routing the first service to the second seller service site, for the second seller service site to process the first service through interconnection with the first seller, and to locally store service data generated by the processing the first service.

In an implementation, the first service is a buyer payment service, and the determining that a first service currently needs to be processed includes: determining that the buyer payment service currently needs to be processed in response to a payment request initiated by the first buyer for a first order, where the payment request includes a selected payment channel; in response to determining that the first service needs to be processed through interconnection with the first buyer, determining the first buyer service site corresponding to the first service area that the first buyer belongs to includes: determining, based on predetermined multiple buyer services that need to interconnect with buyers, that the multiple buyer services include the buyer payment service; and determining the first buyer service site corresponding to the first service area that the first buyer belongs to, where a place of registration of a payment institution corresponding to the payment channel is located in the first service area; and the routing the first service to the first buyer service site, for the first buyer service site to process the first service through interconnection with the first buyer based on the first area user identifier, and locally store the service data generated by the processing the first service, includes: routing the buyer payment service to the first buyer service site, for the first buyer service site to process the buyer payment service through interconnection with the payment channel and interconnection with the first buyer based on the first area user identifier, and to locally store service data generated by the processing the buyer payment service.

In an implementation, the first service is a seller delivery service, and the determining that a first service currently needs to be processed includes: determining that the seller delivery service currently needs to be processed in response to a payment success message for a first order, where the first order includes a product provided by the first seller; and in response determining that the first service needs to be processed through interconnection with the first seller, determining the first seller service site corresponding to the first service area that the first seller belongs to includes: determining, based on predetermined multiple seller services that need to interconnect with sellers, that the multiple seller services include the seller delivery service.

According to a third aspect, a service processing apparatus is provided. The apparatus is integrated into a service platform, the service platform includes multiple area sites corresponding to multiple service areas, and each area site includes a corresponding buyer service site and seller service site; and the apparatus includes: a payment request receiving unit, configured to receive a payment request initiated by a first buyer for a first order, the first buyer corresponding to a first domain-wide user identifier, a product in the first order being provided by a first seller, and the payment request including a selected payment channel; a first area determining unit, configured to determine a first service area that a buyer payment service corresponding to the payment request belongs to, a first area site corresponding to the first service area including a first buyer service site, the first buyer having a first area user identifier in the first service area, which is determined based on multiple area user identifiers associated with the first domain-wide user identifier, and a place of registration of a payment institution corresponding to the payment channel being located in the first service area; a payment service routing unit, configured to route the buyer payment service to the first buyer service site, for the first buyer service site to process the buyer payment service through interconnection with the payment channel and interconnection with the first buyer based on the first area user identifier, and to locally store service data generated by the processing the buyer payment service; a payment success acquisition unit, configured to obtain a payment success message corresponding to the payment request; a second area determining unit, configured to determine that a to-be-processed seller delivery service belongs to a second service area based on the payment success message, a place of registration of the first seller being located in the second service area, and a second area site corresponding to the second service area including a second seller service site; and a delivery service routing unit, configured to route the seller delivery service to the second seller service site, for the second seller service site to process the seller delivery service through interconnection with the first seller, and to locally store service data generated by the processing the seller delivery service.

According to a fourth aspect, a service processing apparatus is provided. The apparatus is integrated into a service platform, the service platform includes multiple area sites corresponding to multiple service areas, and each area site includes a corresponding seller service site and buyer service site; and the apparatus includes: a service determining unit, configured to determine that a first service currently needs to be processed; a buyer site determining unit, configured to: in response to determining that the first service needs to be processed through interconnection with a first buyer, determining a first buyer service site corresponding to a first service area that the first buyer belongs to, the first buyer corresponding to a first domain-wide user identifier and having a first area identity in the first service area, which is determined based on multiple area user identifiers associated with the first domain-wide user identifier; a buyer service routing unit, configured to route the first service to the first buyer service site, for the first buyer service site to process the first service through interconnection with the first buyer based on the first area user identifier, and to locally store service data generated by the processing the first service; a seller site determining unit, configured to: in response to determining that the first service needs to be processed through interconnection with a first seller, determining a second seller service site corresponding to a second service area that the first seller belongs to, a place of registration of the first seller being located in the second service area; and a seller service routing unit, configured to route the first service to the second seller service site, for the second seller service site to process the first service through interconnection with the first seller, and to locally store service data generated by the processing the first service.

According to a fifth aspect, a computer-readable storage medium storing computer programs is provided. A computer performs the method according to the first aspect or the second aspect when the computer programs are executed on the computer.

According to a sixth aspect, a computing device is provided, including a memory and a processor. The memory stores executable code, and the processor implements the method according to the first aspect or the second aspect when executing the executable code.

In conclusion, according to the service processing method disclosed in the implementations of the present specification, a user can use services provided by global sellers by registering with a service platform only once while it is ensured that service data meets regulatory constraints, and a seller and a payment channel can be reused by global users or global buyers by accessing the service platform only once. As such, this can undoubtedly improve user experience greatly and effectively promote service development.

BRIEF DESCRIPTION OF THE SEVERAL VIEWS OF THE DRAWINGS

To describe the technical solutions in multiple implementations disclosed in the present specification more clearly, the following briefly describes the accompanying drawings for illustrating such implementations. Clearly, the accompanying drawings described below are merely multiple implementations disclosed in the present specification, and a person of ordinary skill in the art can derive other drawings from such accompanying drawings without making innovative efforts.

DETAILED DESCRIPTION

The following describes multiple implementations disclosed in the present specification with reference to the accompanying drawings.

As mentioned above, to meet different regulatory requirements of various countries, it is common practice in the industry to physically isolate services in different countries or regions. For example, a certain service platform (e.g., an e-commerce platform) establishes country sites in two countries respectively, and domain names, account systems, system deployment, and data storage of these two country sites are totally isolated.

Although such practice can meet regulatory constraints, user experience and service development are affected. For example, if a person wants to use services in two country sites established on a certain service platform, the user needs to register accounts in the two country sites respectively. In this case, the same person has two platform accounts. However, because account systems of the two country sites are totally isolated and not connected, user data corresponding to the two platform accounts is also isolated, which affects user experience. Therefore, the user needs to register repeatedly, and operations are cumbersome. In addition, in one country site established on the platform, the user cannot view a purchase record of the user in the other country site. Furthermore, personalized recommendation such as platform friend recommendation and product recommendation can only be performed based on each site because user data is isolated, which causes limited accuracy of the recommendation result and limited user experience, and restricts service development.

In addition, two country sites are independent of each other. If a seller or a payment institution wants to develop services in the two country sites, the seller or the payment institution needs to sign up with the two country sites respectively. Therefore, the service motivation of the seller and the payment institution is reduced. In addition, the number of sellers and payment institutions accessing the service platform is limited, affecting user experience in the service platform. In addition, payment channels provided by the seller and the payment institution have high access costs and low reusability, which also restricts service development.

Based on this, the inventors propose a service processing method, which is particularly applicable to cross-domain services. According to the service processing method, a user can use services provided by global sellers only by registering with a service platform once while it is ensured that service data meets regulatory constraints, and a seller and a payment channel can be reused by global users or global buyers only by accessing the service platform once. As such, this can undoubtedly improve user experience greatly and effectively promote service development.

Figure 1:
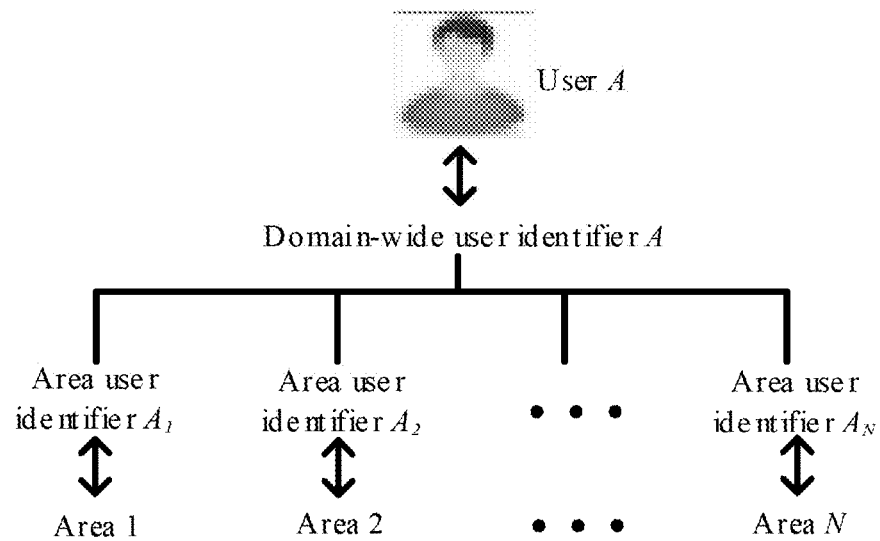
FIG. 1 is a schematic diagram illustrating association of a domain-wide user identity with area identities according to an example.

To implement the previously described service processing method, the inventors propose techniques in the following two aspects:

In one aspect, a domain-wide platform user model is established, including a global user identifier (or referred to as an area-wide user identifier or a domain-wide user identifier) of each user and an area user identifier of each user in each country or region. For example, FIG. 1 shows domain-wide user identifier A of user A included in the domain-wide platform user model and area user identifiers of user A in N (N is a positive integer) areas, for example, including area user identifier $A_1$ in area 1 (an area numbered 1), etc.

It should be noted that because a user is usually a natural person, and is an independent, free and mobile individual, data generated by the user is usually regulated by a region where the data is generated. A major matter of the regulation is to restrict a storage place of the data. For example, a certain country requires user data generated in the country only be allowed to be stored in the country, but usually does not restrict normal and compliant access to the data regulated by the country.

The domain-wide platform user model established above is an association relationship between some identifiers, which does not violate a data regulatory rule because the model does not include user-sensitive information. In addition, a user identifier can be automatically generated after the service platform identifies the same user in different regions, without requiring the user to register repeatedly and even without awareness of the user, thereby reducing user operations. In addition, through the domain-wide platform user model, user data generated by the same user in different regions can be connected.

Therefore, regardless of which region the user is located in, the user can be provided with services based on full data of the user around the world, thereby greatly improving user experience.

In the other aspect, considering main characteristics of cross-domain services are that a buyer and a seller belong to different regions and data regulation requirements of different regions are different, logical sites are designed for each country and region, and the logical sites are classified into buyer service sites for processing buyer services and seller service sites for processing seller services. Based on this, the cross-domain services can be divided into buyer services and seller services. Based on a region that the buyer service belongs to, the buyer service is routed to a buyer service site in the corresponding region, for the site to process the buyer services, and to locally store generated buyer service data. Similarly, based on another region that the seller service belongs to, the seller service is routed to a seller service site in the another region, for the site to process the seller service, and to locally store generated seller service data. It should be understood that a site is a storage area, which can store service execution logic, service data, etc. The logical site means a separate logical site, not a totally isolated physically site. The logical site can provide normal, compliant, and legal data access services for other sites or platforms.

Figure 2:
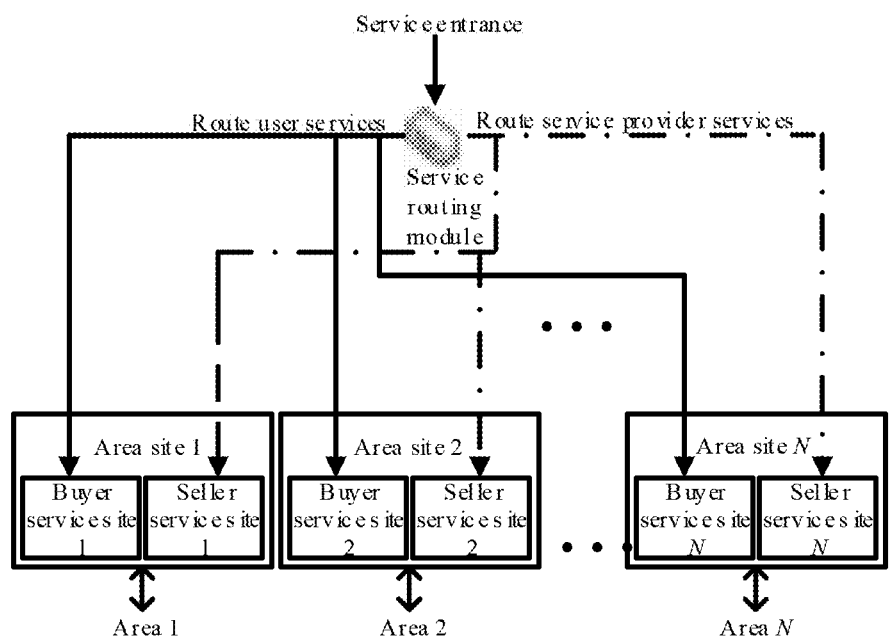
FIG. 2 is a schematic diagram illustrating deployment of logical sites according to an implementation.

For example, FIG. 2 shows multiple logical sites (or referred to as multiple area sites) corresponding to multiple regions. Each logical site includes a buyer service site and a seller service site, and a service routing module illustrated is configured to route a buyer service and a seller service included in cross-domain services to a corresponding buyer service site and seller service site respectively.

It should be noted that determining a home location of a seller service mainly depends on a region that a seller in the seller service belongs to. Before providing a service, the seller usually needs to register with the related department, and a region where a place of registration of the seller is located has jurisdiction over the seller. Therefore, the region that the seller belongs to can be determined based on the place of registration of the seller, and further, the region that the seller in the seller service belongs to is used as the home location of the seller service.

In addition, similar to the seller, a payment channel has a natural identity. The natural identity of the payment channel is a place of registration of a payment institution behind the payment channel. The payment channel is mainly related to a buyer payment service. When a buyer uses a service provided by the seller through the service platform, the buyer needs to pay for the service. In this case, selection of the payment channel is involved. Therefore, in the buyer payment service, a home location of the payment channel and a region where the buyer is located can be comprehensively considered to determine a region corresponding to the buyer payment service, for routing the buyer payment service.

Figure 3:
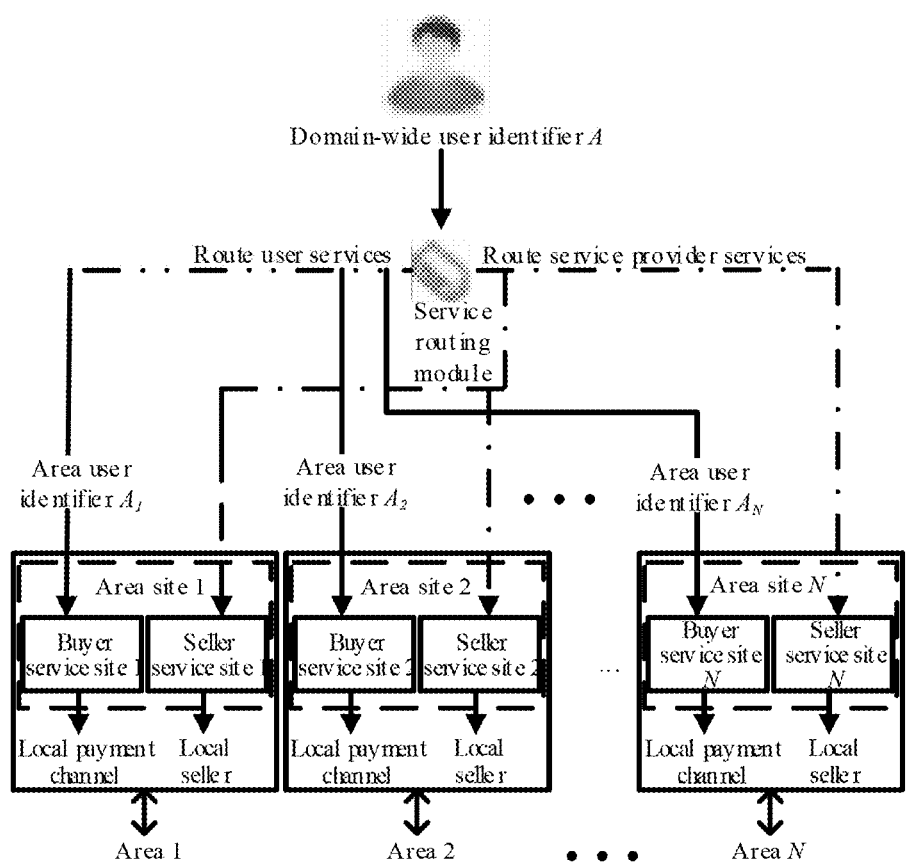
FIG. 3 is a schematic architectural diagram illustrating a scenario where a user uses a domain-wide service according to an implementation.

For example, for ease of intuitive understanding, FIG. 3 shows a scenario where global services are provided for user A based on a domain-wide identity and area identities of user A. Buyer service site 1 interconnects with a buyer service of user A based on area identity $A_1$. In addition, N (N is a positive integer) buyer service sites corresponding to N areas respectively interconnect with local payment channels, and corresponding N seller service sites respectively correspond to local sellers. As such, the seller and the payment channel (or the payment institution behind the payment channel) can provide services to global buyers by signing up with the service platform only once.

The above mainly describes an inventive concept of the service processing method proposed by the inventors as described herein. The following describes implementation steps of the service processing method with reference to example implementations.

Figure 4:
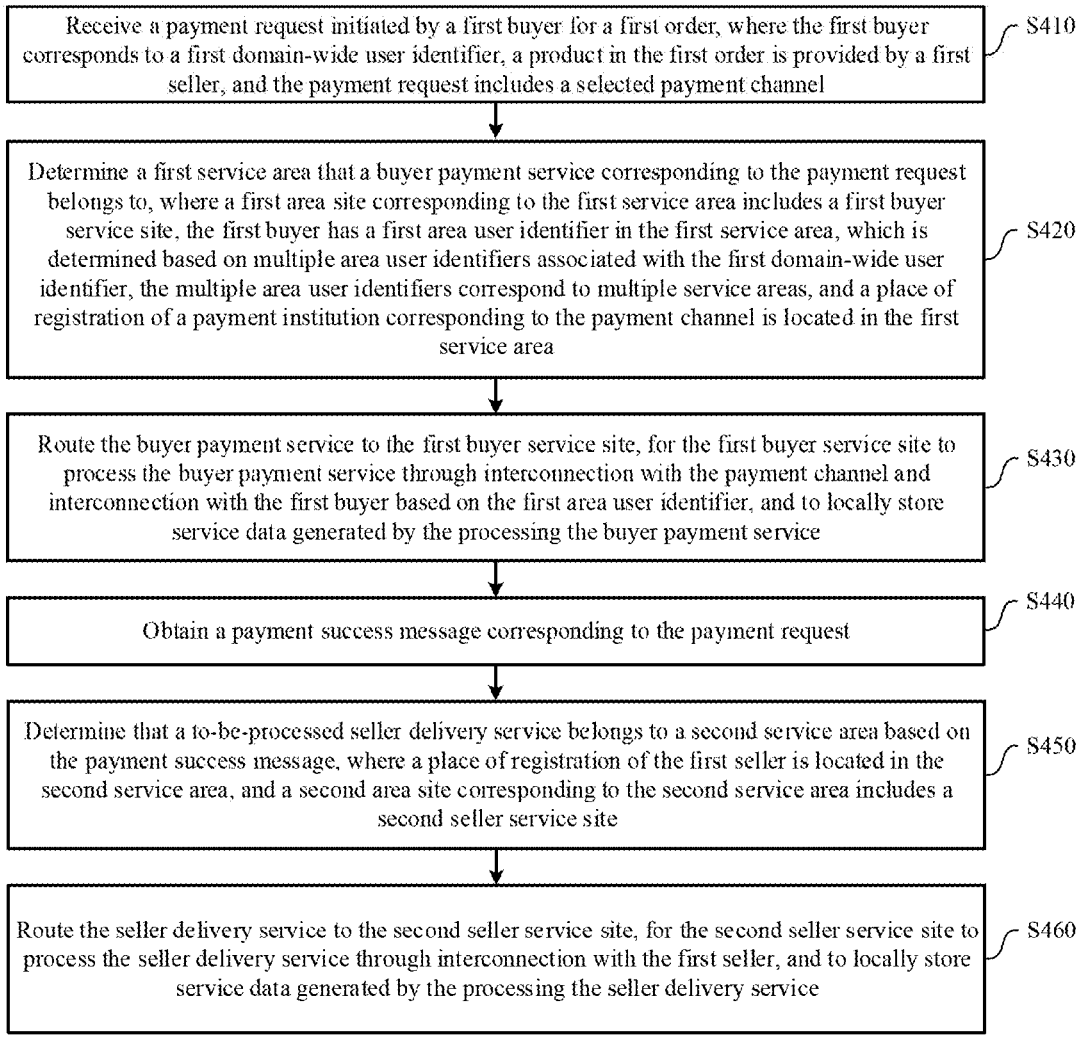
FIG. 4 is a schematic flowchart illustrating a service processing method according to an implementation.

For example, FIG. 4 is a schematic flowchart illustrating a service processing method according to an implementation. The service processing method is performed by a service platform. For example, the service platform includes multiple area sites corresponding to multiple service areas, and each area site includes a corresponding buyer service site and seller service site.

With respect to the above service platform, in an implementation, the service platform can be implemented as a server cluster or a device cluster. In an implementation, the service platform can be an e-commerce platform, a network transaction platform, etc. The service platform allows service providers (sellers) to reside to provide services or products for users in the service platform. It should be noted that the services and the products in the present specification can be considered as equivalent, and refer to services and products in a broad sense. In an implementation, the product (or service) can be a physical product (e.g., a mobile phone), a virtual product (e.g., an e-book, a video course, and a music resource), a consulting service, etc.

With respect to the above multiple service areas, any one of these areas can be a separate country or region or a separate geographical range divided based on the regulatory rule. For example, if several countries reach an agreement to agree on data sharing or cooperative regulation, these countries can be classified into the same service area. It should be understood that the multiple service areas are mutually exclusive, that is, geographical ranges do not overlap. In addition, the service platform can determine, based on the development scale and the service capability of the service platform, a country, a region, or a city where the service platform can develop services, and further obtain multiple service areas through division based on service coverage and the existing data regulatory rule of the service platform. In addition, because the multiple area sites corresponding to the multiple service areas are logical sites, the multiple area sites can be flexibly adjusted later based on the service development situation and the change of the data regulatory rule.

With respect to the above multiple area sites, the multiple area sites correspond to multiple service areas, and each area site corresponds to one service area, and is configured to interconnect with and process services that belong to the corresponding service area. For the description of the area site, references can also be made to the above description of the logical site and the site. Details are omitted herein for simplicity.

With respect to the buyer service site and the seller service site included in each area site, the buyer service site is configured to interconnect with and process local (the region corresponding to the buyer service site) buyer services, and the seller service site is configured to interconnect with and process local seller services. For the description of the buyer service site and the seller service site, references can also be made to the above description of the buyer service site and the seller service site.

The above describes the area sites, the buyer service site, and the seller service site included in the service platform. Based on these sites, the previously described service processing method can be implemented. As shown in FIG. 4, the service processing method includes the following steps:

Step S410: Receive a payment request initiated by a first buyer for a first order. The first buyer corresponds to a first domain-wide user identifier, a product in the first order is provided by a first seller, and the payment request includes a selected payment channel. Step S420: Determine a first service area that a buyer payment service corresponding to the payment request belongs to. A first area site corresponding to the first service area includes a first buyer service site, the first buyer has a first area user identifier in the first service area, which is determined based on multiple area user identifiers associated with the first domain-wide user identifier, and the multiple area user identifiers correspond to multiple service areas. A place of registration of a payment institution corresponding to the payment channel is located in the first service area. Step S430: Route the buyer payment service to the first buyer service site, for the first buyer service site to process the buyer payment service through interconnection with the payment channel and interconnection with the first buyer based on the first area user identifier, and to locally store service data generated by the processing the buyer payment service. Step S440: Obtain a payment success message corresponding to the payment request. Step S450: Determine that a to-be-processed seller delivery service belongs to a second service area based on the payment success message. A place of registration of the first seller is located in the second service area, and a second area site corresponding to the second service area includes a second seller service site. Step S460: Route the seller delivery service to the second seller service site, for the second seller service site to process the seller delivery service through interconnection with the first seller, and to locally store service data generated by the processing the seller delivery service.

For the previously described steps, first, it should be noted that "first" in "first buyer," "first order," etc., and "second" in "second service area," etc., are used for clarity of description, and are used to distinguish between the same type of things, without other restrictive functions such as sorting.

The previously described steps are, for example, further illustrated as follows:

First, in step S410, the payment request initiated by the first buyer for the first order is received. The first buyer corresponds to the first domain-wide user identifier, the product in the first order is provided by the first seller, and the payment request includes the selected payment channel. It should be noted that the first buyer can be any user who uses the service platform, the first order can be any order submitted by the first buyer, and the first seller can be any one of service providers that reside in the service platform.

With respect to determining the above first domain-wide user identifier, in an implementation, before step S410, the method can include: determining the first domain-wide user identifier corresponding to the first buyer in response to the login success operation of the first buyer. In an example implementation, the determining the first domain-wide user identifier can include: obtaining a login user name corresponding to the login success operation, and then performing a hash operation on the login user name to obtain the first domain-wide user identifier. It should be understood that there is a one-to-one correspondence between raw data and encrypted data obtained after the hash operation is performed on the raw data. Therefore, there is a one-to-one mapping relationship between domain-wide user identifiers obtained in this way and login accounts, so that users can be uniquely identified securely and reliably. In an example implementation, the determining the first domain-wide user identifier can further include: obtaining a login user name corresponding to the login success operation, and then querying the first domain-wide user identifier corresponding to the login user name based on a pre-established mapping relationship between a user name and a domain-wide user identifier. In an example implementation, the determining the first domain-wide user identifier can also include: determining an area user identifier corresponding to the login user name in a place of registration of the login user name from registration information stored in the multiple area sites based on the login user name, and then determining, based on the domain-wide platform user model, a domain-wide user identifier corresponding to the area user identifier, namely, the first domain-wide user identifier.

In addition, in addition to being triggered by the logic success operation, determining the first domain-wide user identifier can be triggered by other operations performed after the login success, for example, a tap operation on the product's picture, a submit operation on the order, or a payment operation on the order. In addition, the first domain-wide user identifier can be alternatively determined when there is no login. In an example implementation, after receiving a platform access request (the user opens the service platform interface), the service platform can obtain a Media Access Control (MAC) address of a device that sends the access request, and then determine a corresponding domain-wide user identifier, namely, the first domain-wide user identifier, based on a pre-established mapping relationship between a MAC address and a domain-wide user identifier.

In an implementation, the first domain-wide user identifier can be generated when the user registers a platform account. During an example implementation, for a new account registered successfully, a domain-wide user identifier corresponding to the new account can be generated by using a hash operation, or a data sequence can be generated by using a random algorithm as a new domain-wide user identifier, and a mapping relationship between the new account and the new domain-wide user identifier is established. In another implementation, the first domain-wide user identifier can be generated when the user operates the service platform. In an example implementation, after receiving the platform access request, the service platform can obtain the MAC address of the device that sends the access request, and then search the established mapping relationship between a MAC address and a domain-wide user identifier for whether the MAC address of the device is included. If the MAC address does not exist, the service platform generates a new domain-wide user identifier corresponding to the MAC address, and updates the mapping relationship by using the new domain-wide user identifier.

The above describes determining and generating the first domain-wide user identifier.

In addition, with respect to creating the first order, in an implementation, the order creation service can be completed by the service platform. Further, in an example implementation, the service platform can send service data of the order creation service to the buyer service site in the service area the first buyer belongs to. It should be noted that when the user gives up payment for the first order, or when the user cancels the first order without paying for the first order, the service platform can discard service data of the first order.

Correspondingly, this step can include: receiving, by the service platform, the payment request from a user terminal used by the first buyer. It should be understood that the user uses, by using the user terminal (e.g., a smartphone or a tablet), a user interaction interface or a platform APP provided by the service platform.

In an implementation, the order creation service can be, for example, completed by the buyer service site in the service area the first buyer belongs to. For example, in response to an example operation of the first buyer on the service platform, a buyer service before order payment corresponding to the first buyer can be routed to a buyer service site in an area where the first buyer is located. The example operation can include a login operation, a login success operation, a page scrolling operation, a picture tap operation, an order submission operation, etc. The buyer service before order payment can include a platform login service, an interface browsing service, an order creation service, etc. In an example implementation, the area where the first buyer is located needs to be determined before order payment is routed to the buyer service site in the area where the first buyer is located. The area can be determined based on location element information of the first buyer obtained in real time. For example, the location element information of the first buyer can be obtained in response to the specified operation, to determine a third service area where the first buyer is currently located. In an example implementation, the location element information can include longitude and latitude information, a network address, an Internet Protocol (IP) address, a logistics consignee address of the first buyer, or a logistics consignor address uploaded by the user terminal. Therefore, the third service area where the user is currently located can be determined so as to route the order creation service to a third buyer service site in the corresponding third area site.

Correspondingly, this step can include: receiving, by the service platform from the third buyer service site, the payment request initiated by the first buyer for the first order.

As described herein, the payment request initiated by the first buyer for the first order can be received. In addition, the product in the first order is provided by the first seller, and the payment request includes the payment channel selected by the first buyer. Based on this, next, in step S420, it is determined that the to-be-processed buyer payment service belongs to the first service area based on the payment request.

As described herein, the buyer payment service involves the user and the payment channel. A service area where the user is located and a service area where a place of registration of a payment institution corresponding to the payment channel is located may be the same or different. When the service areas are the same, the corresponding common service area can be used as the first service area the buyer payment service belongs to. When the service areas are different, one of the two different service areas can be determined as the first service area based on the guidance of the data regulatory requirement or negotiation results between the service platform and data regulatory institutions in different service regions. Based on this, there are multiple implementations for this step.

In an implementation, the service area the buyer payment service belongs to can be determined from the perspective of the service area where the first buyer is located. In an implementation, before step S410, the method can further include: obtaining location element information of the first buyer; determining a third service area where the first buyer is currently located based on the location element information; and then obtaining multiple candidate payment channels (e.g., Yu'e Bao payment, online bank payment of a certain bank, and e-wallet payment) based on the third service area for selection by the first buyer.

In an example implementation, places of registration of payment institutions (e.g., Huabei payment, Yu'e Bao payment, or online bank payment of a certain bank) corresponding to the multiple candidate payment channels are all located in the third service area (e.g., China). Therefore, a place of registration corresponding to the payment channel selected from the multiple candidate payment channels is certainly also located in the third service area. Correspondingly, this step can include: determining the third service area as the service area the buyer payment service belongs to. In this case, the first service area is equivalent to the third service area.

In an example implementation, service areas where multiple places of registration corresponding to the multiple candidate payment channels are located can be service areas allowing service data (including buyer payment service data) locally generated to be stored in the third service area. This means that the service areas corresponding to the multiple candidate payment channels can include the third service area, or can include other service areas. Regardless of which payment channel is selected by the user, storing the buyer payment service data in the third service area meets the data regulatory requirement. Correspondingly, this step can still include: determining the third service area as the service area the buyer payment service belongs to. In this case, the first service area is still equivalent to the third service area.

In an implementation, the service area the buyer payment service belongs to can be determined from the perspective of the service area where the place of registration of the payment institution corresponding to the payment channel is located. In an implementation, this step can include: querying the place of registration corresponding to the selected payment channel, and then determining the service area where the place of registration is located as the first service area the buyer payment service belongs to. In this case, the first service area may be the same as the third service area. If the first service area is different from the third service area, if the data regulatory requirement of the third service area allows service data of the third service area to be stored in the first service area, it is acceptable to attribute the buyer payment service into the first service area, or if the data regulatory requirement does not allow data to be exported, negotiation can be performed, or the previously described implementation of determining the first service area from the user's perspective is used.

In addition, the first buyer has the first area user identifier in the first service area, the first area user identifier is determined based on the multiple area user identifiers associated with the first domain-wide user identifier, and the multiple area user identifiers correspond to the multiple service areas. In an implementation, after determining that the buyer payment service belongs to the first service area, the first area user identifier of the first buyer in the first service area can be determined. In an example implementation, the multiple area user identifiers associated with the first domain-wide user identifier of the first buyer and the corresponding multiple service areas can be queried based on the domain-wide platform user model and the first domain-wide user identifier of the first buyer, and then it can be queried whether the multiple service areas include the first service area. If the multiple service areas include the first service area, the first area user identifier corresponding to the first service area is determined based on a mapping relationship between the multiple service areas and the multiple area user identifiers. If the multiple service areas do not include the first service area, a new user identifier is created as the first area user identifier, and a correspondence between the first area user identifier and the first service area is added to the mapping relationship between the multiple service areas and the multiple area user identifiers. In another implementation, the corresponding first area user identifier can be further determined after it is determined that the first buyer is located in the first service area. In an example implementation, the location element information of the first buyer can be obtained in response to the login success operation, the order submission operation, the interface browsing operation, etc., of the user, so as to determine that the first buyer is located in the first service area and determine the first area user identifier of the first buyer in the first service area. Based on this, the first area user identifier can be obtained.

As described herein, it can be determined that the to-be-processed buyer payment service belongs to the first service area based on the payment request. In addition, the first buyer has the first area user identifier in the first service area.

In addition, it can be determined, based on the above setting of the sites in the service platform, that the area site (referred to as the first area site in the present specification) corresponding to the first service area includes the buyer service site (referred to as the first buyer service site in the present specification) configured to process buyer services in the first service area.

Therefore, step S430 can be performed to route the buyer payment service to the first buyer service site, for the first buyer service site to process the buyer payment service through interconnection with the payment channel and interconnection with the first buyer based on the first area user identifier, and to locally store the service data generated by the processing the buyer payment service.

It should be noted that interconnection with the user and the payment channel in the buyer payment service can be implemented using the existing technologies. Interconnecting with the first buyer based on the first area user identifier means identifying the first buyer using the first area user identifier in the process of interconnection with the first buyer, so as to store service data related to the first buyer and facilitate subsequent access and invocation. Local storage means storage in the first service area, because the first service area is local relative to the first buyer service site. For example, the service data can be stored in the first buyer service site, or can be stored in a local database outside the site. In addition, in an implementation, if data related to the first area user identifier has been stored in the first buyer service site, service data newly generated by the buyer payment service can be associated and stored. In another implementation, if the first area user identifier does not exist in multiple area user identifiers stored in the first buyer service site, the first area user identifier is added to the multiple area user identifiers.

For ease of understanding, the buyer payment service is briefly described. Processing of the buyer payment service mainly includes: interconnecting with the payment channel so that a system of the payment institution corresponding to the payment channel performs a deduction operation on a payment account of the first buyer in the payment channel based on a to-be-paid amount of the first order, and transfers the deducted amount to a financial account of the service platform. It should be understood that subsequently, the service platform performs settlement with the first seller based on a subsequent processing situation of the first order.

As described herein, the buyer payment service can be routed to the first buyer service site, for the first buyer service site to process the buyer payment service. Further, the payment success message corresponding to the payment request can be obtained in step S440.

In an implementation, after successfully performing the deduction operation on the first buyer, the system of the payment institution sends the payment success message to the first buyer service site. Correspondingly, this step can include: receiving, by the service platform, the payment success message from the first buyer service site. In another implementation, after successfully performing the deduction operation on the first buyer, the system of the payment institution can send the payment success message to the first buyer service site and the service platform at the same time. Correspondingly, this step can include: receiving the payment success message from the system of the payment institution.

Above, the payment success message can be obtained. In step S450, it is determined that the to-be-processed seller delivery service belongs to the second service area based on the payment success message. The place of registration of the first seller is located in the second service area. In an implementation, this step can include: determining that the place of registration of the first seller is located in the second service area based on the payment success message; and further determining the second service area as the service area the seller delivery service belongs to. In another implementation, this step can further include: determining the second service area corresponding to the first seller based on a pre-established mapping relationship between a seller and a service area.

In still another implementation, before step S450, the second service area corresponding to the first seller can be determined. For example, the second service area corresponding to the first seller is determined in response to the creation of the first order or in response to the payment request of the first order. Correspondingly, in this step, the second service area previously determined can be directly obtained and used as the service area the seller delivery service belongs to.

It can be seen from the setting of the sites in the service platform that the area site (referred to as the second area site in the present specification) corresponding to the second service area includes the seller service site (referred to as the second seller service site in the present specification). In an implementation, step S450 can be replaced with determining that the to-be-processed seller delivery service belongs to the second seller service site for processing based on the payment success message. In an implementation, the second seller service site corresponding to the first seller can be determined based on the pre-established mapping relationship between a seller and a seller service site.

As described herein, it can be determined that the to-be-processed seller delivery service belongs to the second service area, and it can be determined that the second area site corresponding to the second service area includes the second seller service site. Further, in step S460, the seller delivery service can be routed to the second seller service site, for the second seller service site to process the seller delivery service through interconnection with the first seller, and to locally store service data generated by the processing the seller delivery service. It should be noted that in an implementation, a site responsible for processing the seller delivery service can be alternatively determined as the second seller service site in this step. In addition, interconnection with the first seller in the seller delivery service can be implemented using the existing technologies. As such, the seller delivery service can be routed, so that the second seller service site processes the seller delivery service through interconnection with the first seller.

Through implementation of steps S410 to S460, cross-domain service processing can be implemented. In one situation, the first service area and the second service area are different areas, and the corresponding overall service is a cross-domain (cross-area) service. In another situation, the first service area and the second service area can be the same area, so that intra-domain (intra-area) service processing can be implemented. In summary, the previously described service processing method supports processing of intra-domain services and cross-domain services, facilitating unified management of all the services.

It should be noted that in an implementation, after step S460, the method can further include: routing an order settlement service corresponding to the first seller to the second seller service site, for the second seller service site to process the order settlement service through interconnection with the second seller, and to locally store service data generated by the processing the order settlement service. It should be noted that the order settlement service mainly includes the following: the service platform transfers the payment of the order that has arrived to the corresponding seller. In an example implementation, routing the order settlement service can be triggered in multiple ways, for example, receiving a receipt confirmation message for the first order from the first buyer service site, or receiving the receipt confirmation message from the user terminal of the first buyer, or routing the order settlement service in response to automatic triggering of a period (e.g., one week or one month) specified for the order settlement service. As such, the order settlement service can be routed, so that the second seller service site processes the order settlement service.

In addition, as described above, through the previously described service processing method, the user can view full data of the user, and accurate recommendation can be made to the user by using the full data, so the user experience is improved.

For example, the multiple service areas associated with the several area identities of the first buyer correspond to multiple area sites. Therefore, in an implementation, after step S460, the method can further include: in response to an order viewing instruction sent by the first buyer, querying order information of multiple orders associated with the multiple area user identifiers from the multiple area sites for viewing by the first buyer, where the multiple orders include the first order. As such, orders in each service area can be viewed together.

In an implementation, before step S410, the method can further include:

querying multiple historical orders associated with the multiple area user identifiers from the multiple area sites; and recommending a product to the first buyer based on purchased products included in the multiple historical orders. As such, a user can be assisted in locating a target product, for example, the product included in the first order.

In conclusion, according to the service processing method disclosed in this implementation of the present specification, a user can use services provided by global sellers by registering with the service platform only once while it is ensured that service data meets regulatory constraints, and a seller and a payment channel can be reused by global users or global buyers by accessing the service platform only once. As such, this can undoubtedly improve user experience greatly and effectively promote service development.

In addition, it should be noted that through implementation of the service processing method, a multi-channel payment service of one order and a pool purchase service of multiple users can be further implemented. The pool purchase service means supporting multiple users in submitting one order together. In addition, multiple channels can belong to different service areas, and multiple users can also belong to different service areas. In an implementation, a user selects payment channel A (an account balance is 10 yuan) and payment channel B (an account balance is 20 yuan) for the payment of an order of an amount of 29 yuan. Payment channel A corresponds to service area A and payment channel B corresponds to service area B. In this case, the buyer payment service can be split into two buyer payment services, which are routed to buyer service site A corresponding to service area A and buyer service site B corresponding to service area B respectively, so that the two buyer service sites interconnect with payment channel A and payment channel B respectively to process one of the buyer payment services, thereby completing payment of the order. Similarly, for multiple users, an area identity corresponding to each user can be determined, and then the buyer payment service is split into multiple buyer services, which are routed to corresponding buyer service sites for processing respectively. As such, the service platform can implement multi-channel payment services and cross-domain user pool purchase services.

According to an aspect, an implementation of the present specification further discloses a service processing method. In the service processing method, a service platform determines a to-be-processed service. When determining that the service belongs to a buyer service, the service platform routes the service to a buyer service site in a corresponding area for processing. When determining that the service belongs to a seller service, the service platform routes the service to a seller service site in a corresponding area for processing.

Figure 5:
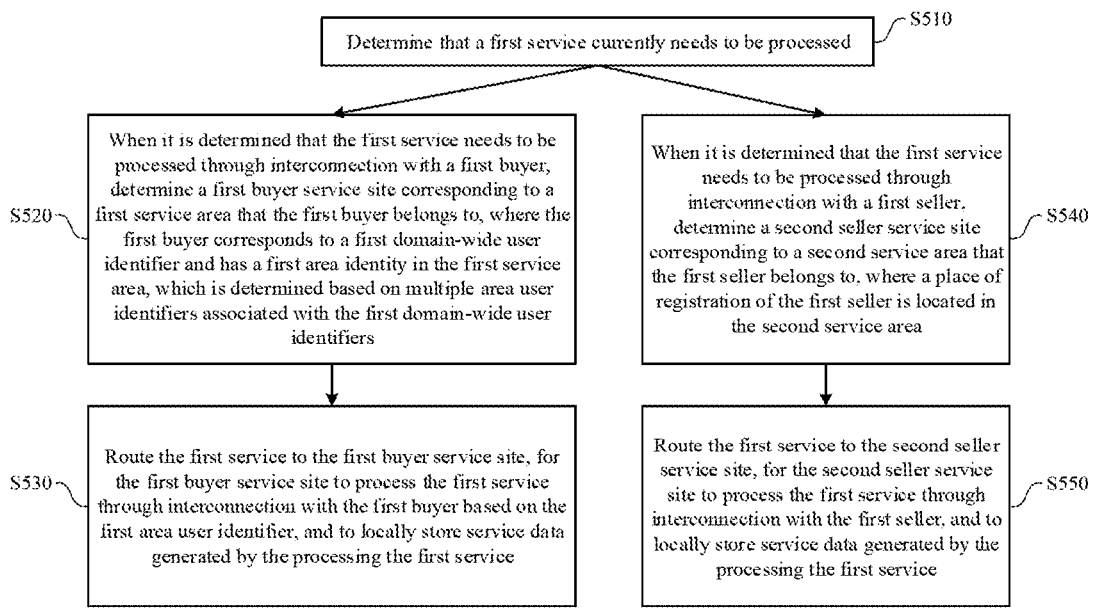
FIG. 5 is a schematic flowchart illustrating a service processing method according to another implementation.

For example, FIG. 5 is a schematic flowchart illustrating a service processing method according to another implementation. The service processing method is performed by a service platform. For example, the service platform includes multiple area sites corresponding to multiple service areas, and each area site includes a corresponding buyer service site and seller service site.

As shown in FIG. 5, the method can include the following steps:

Step S510: Determine that a first service currently needs to be performed.

Further, on one hand, step S520 and step S530 may be performed, detailed as follows: Step S520: When it is determined that the first service needs to be processed through interconnection with a first buyer, determine a first buyer service site corresponding to a first service area that the first buyer belongs to. The first buyer corresponds to a first domain-wide user identifier and has a first area identity in the first service area, which is determined based on multiple area user identifiers associated with the first domain-wide user identifier. Step S530: Route the first service to the first buyer service site, for the first buyer service site to process the first service through interconnection with the first buyer based on the first area user identifier, and to locally store service data generated by the processing the first service. On the other hand, step S540 and step S550 may be performed, detailed as follows: Step S540: When it is determined that the first service needs to be processed through interconnection with a first seller, determine a second seller service site corresponding to a second service area that the first seller belongs to. A place of registration of the first seller is located in the second service area. Step S550: Route the first service to the second seller service site, for the second seller service site to process the first service through interconnection with the first seller, and to locally store service data generated by the processing the first service.

The previously described steps are, for example, illustrated as follows:

First, in step S510, it is determined that the first service currently needs to be processed. For example, in an implementation, the service platform can determine a service for corresponding processing based on an operation of a user or a seller in the service platform. In another implementation, the service platform can determine a corresponding to-be-processed service based on a message sent by a site included in the service platform and with reference to predetermined service logic. In still another implementation, the service platform can automatically trigger service processing based on certain predetermined periodic services (e.g., an order settlement service between the service platform and a seller).

Based on this, in an example implementation, the first service is a buyer payment service. Correspondingly, this step can include: determining that the buyer payment service currently needs to be processed in response to a payment request initiated by the first buyer for a first order. The payment request includes a selected payment channel.

In an example implementation, the first service is a seller delivery service. Correspondingly, this step can include: determining that the seller delivery service currently needs to be processed in response to receiving a payment success message for a first order. The first order includes a product provided by the first seller.

As such, it can be determined that the first service currently needs to be processed.

It should be noted that the service platform provides services for buyers and sellers. Correspondingly, the services to be processed can be services that need to interconnect with buyers, services that need to interconnect with sellers, or other services that do not need to interconnect with buyers or the sellers. Service transactions between the buyer and the seller are implemented by using the service platform as an intermediate site. Therefore, any transaction between the buyer and the seller can be split into a seller service that needs to interconnect with the buyer and a seller service that needs to interconnect with the seller.

Correspondingly, it is determined whether the first service belongs to a buyer service or a seller service. In an implementation, multiple buyer services and multiple seller services can be determined based on the service content of the platform, and then used for matching of the first service. In other words, the first service certainly falls into the multiple buyer services or the multiple seller services if the first service is a service that the buyer or the seller needs to participate in. In an example implementation, the multiple buyer services can include an order creation service, an order buyer payment service, and a personal information change service. In an example implementation, the seller services can include a new product launch (launching a new product in a platform store) service, a seller delivery service, and an order settlement service.

In an implementation, each service has execution logic of the service. Correspondingly, it can be directly determined whether the first service needs to interconnect with the buyer or the seller based on service logic of the first service.

Based on this, after it is determined that the first service currently needs to be processed, on one hand, step S520 and step S530 may be performed. For example, in an implementation, the first service is the buyer payment service. Therefore, step S520 can include: determining, based on predetermined multiple buyer services that need to interconnect with users, that the multiple buyer services include the buyer payment service; and then determining that the first service area that the first buyer belongs to corresponds to the first buyer service site. A place of registration of a payment institution corresponding to the payment channel is located in the first service area. Further, step S530 can include: routing the buyer payment service to the first buyer service site, for the first buyer service site to process the buyer payment service through interconnection with the payment channel and interconnection with the first buyer based on the first area user identifier, and to locally store service data generated by the processing the buyer payment service.

On the other hand, step S540 and step S550 may be performed. For example, in an implementation, the first service is the seller delivery service. Therefore, step S540 can include: determining, based on predetermined multiple seller services that need to interconnect with sellers, that the multiple seller services include the seller delivery service. Further, step S550 can include: routing the seller delivery service to the second seller service site, for the second seller service site to process the seller delivery service through interconnection with the first seller, and to locally store service data generated by the processing the seller delivery service.

In addition, it should be noted that for the description of the steps in FIG. 5, references can also be made to the related description of the steps in FIG. 4. Details are omitted for simplicity.

In conclusion, according to the service processing method disclosed in this implementation of the present specification, a user can use services provided by global sellers by registering with the service platform only once while ensuring that service data meets regulatory constraints, and a seller and a payment channel can be reused by global users or global buyers by accessing the service platform only once. As such, this can undoubtedly improve user experience greatly and effectively promote service development.

Figure 6:
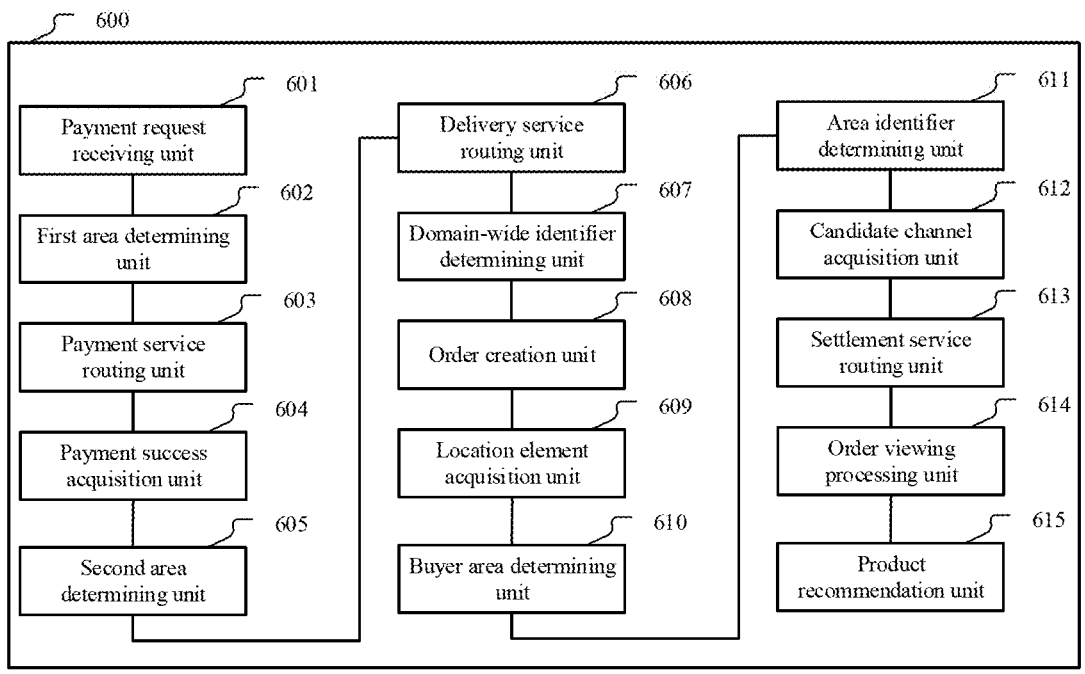
FIG. 6 is a schematic structural diagram illustrating a service processing apparatus according to an implementation.

Corresponding to the service processing method disclosed in the previously described implementation, an implementation of the present specification further discloses a service processing apparatus. Details are as follows:

FIG. 6 is a schematic structural diagram illustrating a service processing apparatus according to an implementation. The apparatus is integrated into a service platform, the service platform includes multiple area sites corresponding to multiple service areas, and each area site includes a corresponding buyer service site and seller service site. As shown in FIG. 6, an apparatus 600 includes: a payment request receiving unit 601, configured to receive a payment request initiated by a first buyer for a first order, the first buyer corresponding to a first domain-wide user identifier, a product in the first order being provided by a first seller, and the payment request including a selected payment channel; a first area determining unit 602, configured to determine a first service area that a buyer payment service corresponding to the payment request belongs to, a first area site corresponding to the first service area including a first buyer service site, the first buyer having a first area user identifier in the first service area, which is determined based on multiple area user identifiers associated with the first domain-wide user identifier, and a place of registration of a payment institution corresponding to the payment channel being located in the first service area; a payment service routing unit 603, configured to route the buyer payment service to the first buyer service site, for the first buyer service site to process the buyer payment service through interconnection with the payment channel and interconnection with the first buyer based on the first area user identifier, and to locally store service data generated by the processing the buyer payment service; a payment success acquisition unit 604, configured to obtain a payment success message corresponding to the payment request; a second area determining unit 605, configured to determine that a to-be-processed seller delivery service belongs a second service area based on the payment success message, a place of registration of the first seller being located in the second service area, and a second area site corresponding to the second service area including a second seller service site; and a delivery service routing unit 606, configured to route the seller delivery service to the second seller service site, for the second seller service site to process the seller delivery service through interconnection with the first seller, and to locally store service data generated by the processing the seller delivery service.

In an implementation, the apparatus 600 further includes: a domain-wide identifier determining unit 607, configured to determine the first domain-wide user identifier corresponding to the first buyer in response to the successful login of the first buyer; and an order creation unit 608, configured to create the first order in response to receiving an order creation request initiated by the first buyer based on the product.

In an implementation, the domain-wide identifier determining unit 607 is, for example, configured to obtain a user name of the first buyer; and perform a hash operation on the user name to obtain the first domain-wide user identifier; or query the first domain-wide user identifier based on a pre-established mapping relationship between a user name and a domain-wide user identifier.

In an implementation, the apparatus 600 further includes: a location element acquisition unit 609, configured to obtain location element information of the first buyer; a buyer area determining unit 610, configured to determine a service area in which the first buyer is currently located based on the location element information, and use the service area as the first service area; an area identifier determining unit 611, configured to determine the first service area user identifier of the first buyer in the first service area based on the multiple area user identifiers corresponding to multiple service areas; and a candidate channel acquisition unit 612, configured to obtain multiple candidate payment channels for selection by the first buyer, where places of registration of payment institutions corresponding to the multiple candidate payment channels are all located in the first service area.

In an example implementation, the location element information includes at least one of longitude and latitude information, a network address, an IP address, and a consignee address included in the first order.

In an example implementation, the area identifier determining unit 611 is, for example, configured to create a new user identifier as the first area user identifier when a user identifier corresponding to the first service area does not exist in the multiple area user identifiers; and classify the first area user identifier into the multiple area user identifiers.

In an implementation, the first area determining unit 602 is, for example, configured to determine a place of registration corresponding to the payment channel, and use a service area in which the place of registration is located as the first service area.

In an example implementation, the apparatus 600 further includes an area identifier determining unit 611, configured to determine the first area user identifier of the first buyer in the first service area based on the multiple area user identifiers corresponding to multiple service areas.

In an implementation, the second area determining unit 605 is configured to determine a place of registration of the first seller based on the payment success message, and use a service area in which the place of registration is located as the second service area.

In an implementation, the apparatus 600 further includes a settlement service routing unit 613, configured to route an order settlement service corresponding to the first seller to the second seller service site, for the second seller service site to process the order settlement service through interconnection with the second seller, and to locally store service data generated by the processing the order settlement service.

In an implementation, the apparatus 600 further includes an order viewing processing unit 614, configured to: in response to an order viewing instruction sent by the first buyer, query order information of multiple orders associated with the multiple area user identifiers from the multiple area sites for viewing by the first buyer, where the multiple orders include the first order.

In an implementation, the apparatus 600 further includes a product recommendation unit 615, configured to query multiple historical orders associated with the multiple area user identifiers from the multiple area sites; and recommend a product to the first buyer based on purchased products included in the multiple historical orders.

In conclusion, according to the service processing apparatus disclosed in this implementation of the present specification, a user can use services provided by global sellers by registering with the service platform only once while it is ensured that service data meets regulatory constraints, and a seller and a payment channel can be reused by global users or global buyers by accessing the service platform only once. As such, this can undoubtedly improve user experience greatly and effectively promote service development.

Figure 7:
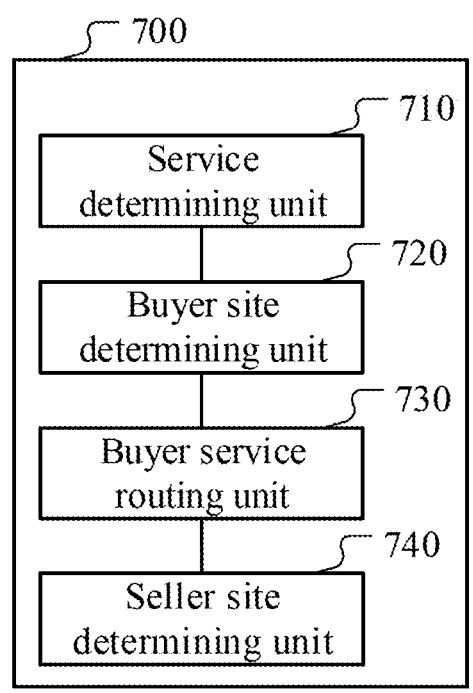
FIG. 7 is a schematic structural diagram illustrating a service processing apparatus according to another implementation.

FIG. 7 is a schematic structural diagram illustrating a service processing apparatus according to another implementation. An apparatus 700 is integrated into a service platform, the service platform includes multiple area sites corresponding to multiple service areas, and each area site includes a corresponding seller service site and buyer service site. As shown in FIG. 7, the apparatus 700 includes:

a service determining unit 710, configured to determine that a first service currently needs to be processed; a buyer site determining unit 720, configured to determine, when it is determined that the first service needs to be processed through interconnection with a first buyer, a first buyer service site corresponding to a first service area that the first buyer belongs to, the first buyer corresponding to a first domain-wide user identifier and having a first area identity in the first service area, which is determined based on multiple area user identifiers associated with the first domain-wide user identifier; a buyer service routing unit 730, configured to route the first service to the first buyer service site, for the first buyer service site to process the first service through interconnection with the first buyer based on the first area user identifier, and to locally store service data generated by the processing the first service; a seller site determining unit 740, configured to determine, when it is determined that the first service needs to be processed through interconnection with a first seller, a second seller service site corresponding to a second service area that the first seller belongs to, a place of registration of the first seller being located in the second service area; and a seller service routing unit 750, configured to route the first service to the second seller service site, for the second seller service site to process the first service through interconnection with the first seller, and to locally store service data generated by the processing the first service.

In an implementation, the first service is a buyer payment service; and the service determining unit 710 is, for example, configured to determine that the buyer payment service currently needs to be processed in response to a payment request initiated by the first buyer for a first order, where the payment request includes a selected payment channel; the buyer site determining unit 720 is, for example, configured to determine, based on predetermined multiple buyer services that need to interconnect with buyers, that the multiple buyer services include the buyer payment service; and determine the first buyer service site corresponding to the first service area that the first buyer belongs to, where a place of registration of a payment institution corresponding to the payment channel is located in the first service area; and the buyer service routing unit 730 is, for example, configured to route the buyer payment service to the first buyer service site, for the first buyer service site to process the buyer payment service through interconnection with the payment channel and interconnection with the first buyer based on the first area user identifier, and to locally store service data generated by the processing the buyer payment service.

In an implementation, the first service is a seller delivery service; and the service determining unit 710 is, for example, configured to determine that the seller delivery service currently needs to be processed in response to a payment success message for a first order, where the first order includes a product provided by the first seller; and the seller site determining unit 740 is, for example, configured to determine, based on predetermined multiple seller services that need to interconnect with sellers, that the multiple seller services include the seller delivery service.

In conclusion, according to the service processing apparatus disclosed in this implementation of the present specification, a user can use services provided by global sellers by registering with the service platform only once while it is ensured that service data meets regulatory constraints, and a seller and a payment channel can be reused by global users or global buyers by accessing the service platform only once. As such, this can undoubtedly improve user experience greatly and effectively promote service development.

An implementation of still another aspect further provides a computer-readable storage medium storing computer programs. A computer performs the method described in FIG. 4 or FIG. 5 when the computer programs are executed on the computer.

An implementation of still another aspect further provides a computing device, including a memory and a processor. The memory stores executable code, and the processor implements the method described in FIG. 4 or FIG. 5 when executing the executable code.

A person skilled in the art should be aware that in the previous one or more examples or functions described in the multiple implementations disclosed in the present specification can be implemented by hardware, software, firmware, or any combination thereof. When the functions are implemented by software, the functions can be stored in a computer-readable medium or transmitted as one or more instructions or code in the computer-readable medium.

The objectives, technical solutions, and benefits of the multiple implementations disclosed in the present specification are further described in detail in the above example implementations. It should be understood that the above descriptions are merely example implementations of the multiple implementations disclosed in the present specification, but are not intended to limit the protection scope of the multiple implementations disclosed in the present specification. Any modification, equivalent replacement, or improvement made on the basis of the technical solutions of the multiple implementations disclosed in the present specification shall fall within the protection scope of the multiple implementations disclosed in the present specification.

The various embodiments described above can be combined to provide further embodiments. Aspects of the embodiments can be modified, if necessary, to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A service processing method, the method comprising:
deploying a plurality of servers for implementing a plurality of area sites of a service platform, the plurality of area sites respectively corresponding to a plurality of geographic regions, the plurality of geographic regions not overlapping with one another, a server of each area site of the plurality of area sites physically located in a geographic region corresponding to the area site and configured to interconnect with a service in the geographic region and to locally store data generated through the interconnection with the service in the geographic region;
assigning, by the service platform, a first domain-wide user identifier and a first plurality of area user identifiers to a first buyer, the first plurality of area user identifiers each linked to the first domain-wide user identifier and corresponding to a respective area site of the plurality of area sites;
assigning, by the service platform, a second domain-wide user identifier and a second plurality of area user identifiers to a first seller, the second plurality of area user identifiers each linked to the second domain-wide user identifier and corresponding to a respective area site of the plurality of area sites;
receiving a payment request initiated by the first buyer for a first order, a product in the first order being provided by the first seller, and the payment request including a selected payment channel;
determining that a buyer payment service corresponding to the payment request belongs to a first geographic region, a first area site of the plurality of area sites corresponding to the first geographic region including a first buyer service site, the first buyer having a first area user identifier for the first area site, the first geographic region being determined based on a place of registration of a payment institution corresponding to the selected payment channel being located in the first geographic region;
routing the buyer payment service correspondng to the first order to the first buyer service site, for the first buyer service site to process the buyer payment service through interconnection with the selected payment channel and interconnection with the first buyer based on the first area user identifier of the first buyer, and to locally store at the first area site service data generated by the processing the buyer payment service;
obtaining a payment success message corresponding to the payment request;
determining that a seller delivery service corresponding to the first order belongs to a second geographic region based on a place of registration of the first seller being located in the second geographic region, the second geographic region different from the first geographic region, a second area site corresponding to the second geographic region including a second seller service site, the first seller having a second area user identifier for the second area site; and
routing the seller delivery service to the second seller service site, for the second seller service site to process the seller delivery service through interconnection with the first seller based on the second area user identifier of the first seller, and to locally store at the second area site service data generated by the processing the seller delivery service.

2. The method according to claim 1, further comprising:
before the receiving the payment request initiated by the first buyer for the first order,
determining the first domain-wide user identifier corresponding to the first buyer in response to a successful login of the first buyer; and
creating the first order in response to receiving an order creation request initiated by the first buyer based on the product.

3. The method according to claim 2, wherein the determining the first domain-wide user identifier corresponding to the first buyer includes:
obtaining a user name of the first buyer; and
obtaining the first domain-wide user identifier by at least one of performing a hash operation on the user name or querying the first domain-wide user identifier based on an existing mapping relationship between the user name and the domain-wide user identifier.

4. The method according to claim 2, after the creating the first order and before the receiving the payment request initiated by the first buyer for the first order, further comprising:
obtaining location element information of the first buyer;
determining a geographic region in which the first buyer is currently located based on the location element information, and using the geographic region as the first geographic region;
determining the first area user identifier of the first buyer in the first geographic region based on the first plurality of area user identifiers; and
obtaining a plurality of candidate payment channels for selection by the first buyer, wherein places of registration of payment institutions corresponding to the plurality of candidate payment channels are all located in the first geographic region.

5. The method according to claim 4, wherein the location element information includes at least one of longitude and latitude information, a network address, an Internet Protocol (IP) address, and a consignee address included in the first order.

6. The method according to claim 4, wherein the determining the first area user identifier of the first buyer in the first geographic region based on the plurality of area user identifiers corresponding to the plurality of geographic regions includes:
creating a new user identifier as the first area user identifier in response to a user identifier corresponding to the first geographic region not existing in the plurality of area user identifiers; and
classifying the first area user identifier into the plurality of area user identifiers.

7. The method according to claim 1, wherein the determining the first geographic region that the buyer payment service corresponding to the payment request belongs to includes:
determining a place of registration corresponding to the payment channel, and
determining a geographic region in which the place of registration is located as the first geographic region.

8. The method according to claim 7, further comprising:
after the determining the first geographic region that the buyer payment service corresponding to the payment request belongs to, and before the routing the buyer payment service to the first buyer service site, determining the first area user identifier of the first buyer in the first geographic region based on the first plurality of area user identifiers.

9. The method according to claim 1, wherein the determining the second geographic region the seller delivery service belongs to based on the payment success message includes:
determining a place of registration of the first seller based on the payment success message, and
determining a geographic region in which the place of registration is located as the second geographic region.

10. The method according to claim 1, further comprising:
after the routing the seller delivery service to the second seller service site,
routing an order settlement service corresponding to the first seller to the second seller service site, for the second seller service site to process the order settlement service through interconnection with the second seller, and to locally store service data generated by the processing the order settlement service.

11. The method according to claim 1, further comprising:
after the routing the seller delivery service to the second seller service site,
in response to an order viewing instruction sent by the first buyer, querying order information of a plurality of orders associated with the first plurality of area user identifiers from the plurality of area sites for viewing by the first buyer, wherein the plurality of orders include the first order.

12. The method according to claim 1, further comprising:
before the receiving the payment request initiated by the first buyer for the first order,
querying a plurality of historical orders associated with the first plurality of area user identifiers from the plurality of area sites; and
recommending a product to the first buyer based on purchased products included in the plurality of historical orders.

13. A service processing method, the method comprising:
deploying a plurality of servers for implementing a plurality of area sites of a service platform, the plurality of area sites respectively corresponding to a plurality of geographic regions, the plurality of geographic regions not overlapping with one another, a server of each area site of the plurality of area sites physically located in a geographic region corresponding to the area site and configured to interconnect with a service in the geographic region and to locally store data generated through the interconnection with the service in the geographic region, each area site including a buyer service site and a seller service site;
assigning, by the service platform, a first domain-wide user identifier and a first plurality of area user identifiers to a first buyer, the first plurality of area user identifiers each linked to the first domain-wide user identifier and corresponding to a respective area site of the plurality of area sites;
assigning, by the service platform, a second domain-wide user identifier and a second plurality of area user identifiers to a first seller, the second plurality of area user identifiers each linked to the second domain-wide user identifier and corresponding to a respective area site of the plurality of area sites;
determining that a first service is currently to be processed;
in response to determining that the first service is to be processed through interconnection with the first buyer:
determining a first buyer service site corresponding to a first geographic region of the plurality of geographic regions that the first buyer belongs to, the first buyer having a first area user identifier in the first geographic region, the first area user identifier being determined based on the first plurality of area user identifiers associated with the first domain-wide user identifier; and
routing the first service to the first buyer service site, for the first buyer service site to process the first service through interconnection with the first buyer based on the first area user identifier, and to locally store at the first buyer service site service data generated by the processing the first service; and
in response to determining that the first service is to be processed through interconnection with the first seller:
determining a second seller service site corresponding to a second geographic region that the first seller belongs to, the second geographic region different from the first geographic region, a place of registration of the first seller being located in the second geographic region, the first seller having a second area user identifier for the second geographic region; and
routing the first service to the second seller service site, for the second seller service site to process the first service through interconnection with the first seller based on the second area user identifier, and to locally store service data generated by the processing the first service.

14. The method according to claim 13, wherein the first service is a buyer payment service, and the determining that the first service currently is to be processed includes:
determining that the buyer payment service is currently to be processed in response to a payment request initiated by the first buyer for a first order, wherein the payment request includes a selected payment channel;
wherein in response to determining that the first service is to be processed through interconnection with the first buyer, the determining the first buyer service site corresponding to the first geographic region that the first buyer belongs to includes:
determining, based on a predetermined plurality of buyer services that need to interconnect with buyers, that the plurality of buyer services include the buyer payment service; and
determining the first buyer service site corresponding to the first geographic region that the first buyer belongs to, wherein a place of registration of a payment institution corresponding to the payment channel is located in the first geographic region; and
wherein the routing the first service to the first buyer service site, for the first buyer service site to process the first service through interconnection with the first buyer based on the first area user identifier, and locally store the service data generated by the processing the first service includes:
routing the buyer payment service to the first buyer service site, for the first buyer service site to process the buyer payment service through interconnection with the payment channel and interconnection with the first buyer based on the first area user identifier, and to locally store at the first buyer service site service data generated by the processing the buyer payment service.

15. The method according to claim 13, wherein the first service is a seller delivery service, and the determining that the first service is currently to be processed includes:
  determining that the seller delivery service is currently to be processed in response to a payment success message for a first order, wherein the first order includes a product provided by the first seller; and
  in response to determining that the first service is to be processed through interconnection with the first seller, the determining the first seller service site corresponding to the first geographic region that the first seller belongs to includes:
    determining, based on a predetermined plurality of seller services that need to interconnect with sellers, that the plurality of seller services include the seller delivery service.

16. A computing device, comprising a memory and a processor, the memory storing executable instructions, the executable instructions, when executed by the processor, enable the processor to implement acts including:
  deploying a plurality of servers for implementing a plurality of area sites of a service platform, the plurality of area sites respectively corresponding to a plurality of geographic regions, the plurality of geographic regions not overlapping with one another, a server of each area site of the plurality of area sites physically located in a geographic region corresponding to the area site and configured to interconnect with a service in the geographic region and to locally store data generated through the interconnection with the service in the geographic region;
  assigning a first domain-wide user identifier and a first plurality of area user identifiers to a first buyer, the first plurality of area user identifiers each linked to the first domain-wide user identifier and corresponding to a respective area site of the plurality of area sites;
  assigning a second domain-wide user identifier and a second plurality of area user identifiers to a first seller, the second plurality of area user identifiers each linked to the second domain-wide user identifier and corresponding to a respective area site of the plurality of area sites;
  receiving a payment request initiated by the first buyer for a first order, a product in the first order being provided by the first seller, and the payment request including a selected payment channel;
  determining that a buyer payment service corresponding to the payment request belongs to a first geographic region, a first area site of the plurality of area sites corresponding to the first geographic region including a first buyer service site, the first buyer having a first area user identifier for the first area site, the first geographic region being determined based on a place of registration of a payment institution corresponding to the selected payment channel being located in the first geographic region;
  routing the buyer payment service corresponding to the first order to the first buyer service site, for the first buyer service site to process the buyer payment service through interconnection with the selected payment channel and interconnection with the first buyer based on the first area user identifier of the first buyer, and to locally store at the first area site service data generated by the processing the buyer payment service;
  obtaining a payment success message corresponding to the payment request;
  determining that a seller delivery service corresponding to the first order belongs to a second geographic region based on the payment success message, a place of registration of the first seller being located in the second geographic region, the second geographic region different from the first geographic region, a second area site corresponding to the second geographic region including a second seller service site, the first seller having a second area user identifier for the second area site; and
  routing the seller delivery service to the second seller service site, for the second seller service site to process the seller delivery service through interconnection with the first seller based on the second area user identifier of the first seller, and to locally store at the second area site service data generated by the processing the seller delivery service.

17. The computing device according to claim 16, wherein the acts further include:
  before the receiving the payment request initiated by the first buyer for the first order,
    determining the first domain-wide user identifier corresponding to the first buyer in response to a successful login of the first buyer; and
    creating the first order in response to receiving an order creation request initiated by the first buyer based on the product.

18. A computing device, comprising a memory and a processor, the memory storing executable instructions, the executable instructions, when executed by the processor, enable the processor to implement acts including:
  deploying a plurality of servers for implementing a plurality of area sites of a service platform, the plurality of area sites respectively corresponding to a plurality of geographic regions, the plurality of geographic regions not overlapping with one another, a server of each area site of the plurality of area sites physically located in a geographic region corresponding to the area site and configured to interconnect with a service in the geographic region and to locally store data generated through the interconnection with the service in the geographic region, each area site including a buyer service site and a seller service site;
  assigning a first domain-wide user identifier and a first plurality of area user identifiers to a first buyer, the first plurality of area user identifiers each linked to the first domain-wide user identifier and a corresponding to a respective area site of the plurality of area sites;
  assigning a second domain-wide user identifier and a second plurality of area user identifiers to a first seller, the second plurality of area user identifiers each linked to the second domain-wide user identifier and a corresponding to a respective area site of the plurality of area sites;
  determining that a first service is currently to be processed;
  in response to determining that the first service is to be processed through interconnection with the first buyer:
    determining a first buyer service site corresponding to a first geographic region of the plurality of geographic regions that the first buyer belongs to, the first buyer having a first area user identifier in the first geographic region, the first area user identifier being determined based on a plurality of area user identifiers associated with the first domain-wide user identifier; and routing the first service to the first buyer service site, for the first buyer service site to process the first service through interconnection with the first buyer based on the first area user identifier, and to locally store at the first buyer service site service data generated by the processing the first service; and in response to determining that the first service is to be processed through interconnection with the first seller:
determining a second seller service site corresponding to a second geographic region that the first seller belongs to, the second geographic region different from the first geographic region, a place of registration of the first seller being located in the second geographic region, the first seller having a second area user identifier for the second geographic region; and routing the first service to the second seller service site, for the second seller service site to process the first service through interconnection with the first seller based on the second area user identifier, and to locally store service data generated by the processing the first service.

19. The computing device according to claim 18, wherein the first service is a buyer payment service, and the determining that the first service currently is to be processed includes:
determining that the buyer payment service is currently to be processed in response to a payment request initiated by the first buyer for a first order, wherein the payment request includes a selected payment channel;

wherein in response to determining that the first service is to be processed through interconnection with the first buyer, the determining the first buyer service site corresponding to the first geographic region that the first buyer belongs to includes:
determining, based on a predetermined plurality of buyer services that need to interconnect with buyers, that the plurality of buyer services include the buyer payment service; and determining the first buyer service site corresponding to the first geographic region that the first buyer belongs to, wherein a place of registration of a payment institution corresponding to the payment channel is located in the first geographic region; and wherein the routing the first service to the first buyer service site, for the first buyer service site to process the first service through interconnection with the first buyer based on the first area user identifier, and locally store the service data generated by the processing the first service, includes:
routing the buyer payment service to the first buyer service site, for the first buyer service site to process the buyer payment service through interconnection with the payment channel and interconnection with the first buyer based on the first area user identifier, and to locally store at the first buyer service site service data generated by the processing the buyer payment service.

20. The computing device according to claim 18, wherein the first service is a seller delivery service, and the determining that the first service is currently to be processed includes:
determining that the seller delivery service is currently to be processed in response to a payment success message for a first order, wherein the first order includes a product provided by the first seller; and in response to determining that the first service is to be processed through interconnection with the first seller, the determining the first seller service site corresponding to the first geographic region that the first seller belongs to includes:
determining, based on a predetermined plurality of seller services that need to interconnect with sellers, that the plurality of seller services include the seller delivery service.

* * * * *

UNITED STATES PATENT AND TRADEMARK OFFICE
CERTIFICATE OF CORRECTION

PATENT NO. : 11,328,270 B2
APPLICATION NO. : 17/356324
DATED : May 10, 2022
INVENTOR(S) : Jia Lei

It is certified that error appears in the above-identified patent and that said Letters Patent is hereby corrected as shown below:

In the Claims

Column 23, Claim 1, Line 45:
"payment service correspondng to"
Should read:
--payment service corresponding to--.

Column 28, Claim 18, Line 48:
"identifier and a corresponding"
Should read:
--identifier and corresponding--.

Signed and Sealed this
Thirteenth Day of February, 2024

Katherine Kelly Vidal
*Director of the United States Patent and Trademark Office*